UNITED STATES PATENT OFFICE.

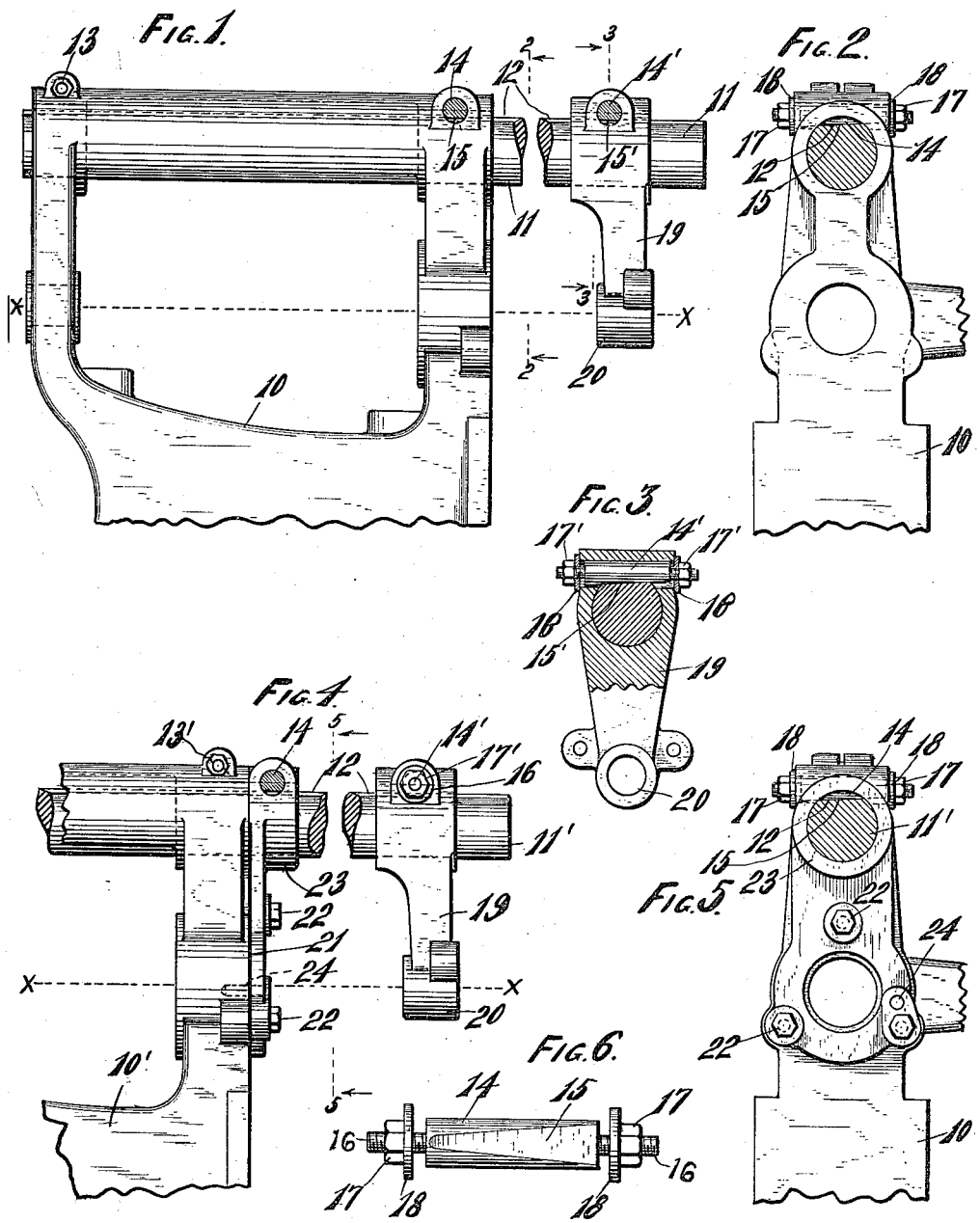

JOHN GOETZ, OF WEST ALLIS, WISCONSIN, ASSIGNOR TO THE KEMPSMITH MANUFACTURING CO., OF MILWAUKEE, WISCONSIN, A CORPORATION OF WISCONSIN.

ARM FOR MILLING-MACHINES.

1,153,618. Specification of Letters Patent. Patented Sept. 14, 1915.

Application filed March 13, 1914. Serial No. 824,367.

*To all whom it may concern:*

Be it known that I, JOHN GOETZ, a citizen of the United States, and resident of West Allis, in the county of Milwaukee and State of Wisconsin, have invented new and useful Improvements in Arms for Milling-Machines, of which the following is a description, reference being had to the accompanying drawings, which are a part of this specification.

This invention relates to milling machine arms, known as adjustable overhanging arms, and has for its object to provide such an arm of a construction which will assure the alinement of the arbor support with the spindle in all adjustments of the arbor support on the arm.

Another object of the invention is to adapt ordinary overhanging arms which are round in cross section to such alinement of the arbor support with the spindle in the various adjustments of the arbor support.

With the above and other objects in view the invention consists in the milling machine arm as herein claimed.

Referring to the accompanying drawings in which like characters of reference indicate the same parts in the different views, Figure 1 is a side elevation of a portion of a milling machine showing the arm construction in accordance with this invention; Fig. 2 is an end view thereof with the arm section on the plane of line 2—2 of Fig. 1; Fig. 3 is a sectional elevation of the arbor support on the plane of line 3—3 of Fig. 1; Fig. 4 is a view, similar to Fig. 1, of a modified form of the invention as adapted to milling machines in present use; Fig. 5 is an end view thereof with the arm section on the plane of line 5—5 of Fig. 4; and, Fig. 6 is a detail view of one of the wedge pins.

In these drawings 10 indicates the milling machine frame and 11 is the overhanging arm which is longitudinally adjustable in the frame as usual. This arm 11 is circular in cross section except for a flat surface 12 formed therein from end to end. At the rear end of the arm bearing in the frame the arm is clamped in the usual manner by means of a bolt 13 passing through a split portion of the bearing; but at the front portion of the bearing, instead of splitting it and providing a clamping bolt 13 as usual, it is left without being split and is provided with a transverse opening at its upper part forming a seat for a wedge pin 14. The wedge pin is of a cylindrical shape except for a flat surface 15 which is in a plane oblique to the axis of the pin so that the flat surface forms a cam surface or an inclined wedging surface to fit against the flat surface 12 of the arm. At each end of the wedge pin 14 is a projecting threaded stud 16 on which a nut 17 is threaded to bear against a washer 18 fitting against the flat sides of the arm bearing of the frame. By tightening one nut, with the other loosened, the wedge pin 14 is drawn in a direction to more tightly wedge itself against the flat surface 12 of the overhanging arm, while by loosening that nut and tightening the other the wedge pin is drawn in the opposite direction so as to release the arm and permit of its adjustment. In any adjustment of the arm the flat surface thereof remains at the same angle to the horizontal because of the fit of the flat surface of the wedge pin against the flat surface of the arm.

An arbor support 19 is mounted on the arm 11 without having its collar portion split as usual, and is held at any desired distance from the frame by means of a wedge pin 14' identical with the wedge pin 14 on the frame. Thus, the angularity of the flat surface 12 of the arm with relation to the horizontal is fixed by means of the wedge pin 14 and the angularity of the arbor support 19 with relation to the flat surface 12 of the arm is fixed by the wedge pin 14', notwithstanding the adjustment of either the arm in the frame or of the arbor support on the arm. This assures the arbor bearing 20 of the arbor support remaining in perfect alinement with the axis of the spindle, represented by a dotted line X—X in Fig. 1, in all adjustments of the arbor arm.

In the modification of the invention shown in Figs. 4 and 5 the invention is designed to adapt the ordinary overhanging arms of circular cross section of milling machines in present use to the guiding action for preserving the alinement of the arbor bearing in the arbor support with the axis of the spindle as in the construction above described. The frame 10' having been originally designed for clamping the overhanging arm by means of the bolt 13' in front as well as at the rear, such frame is not suitable for receiving the wedge pin 14 direct, but a supplemental frame plate 21 is secured to the front of the frame 10' by means of three bolts 22, and such supplemental frame carries a bearing 23 at its upper end for the overhanging arm 11' which latter is milled from its original, truly circular cross section so as to contain the flat surface 12' from one end to the other, as in the construction above described. The arbor support 19 is employed as before with its wedge pin 14' fitting upon the flat surface 12' of the arm to assure the alinement of the arbor bearing 20 with the axis of the spindle. In order that the supplemental frame plate 21 may always be spotted in the same position, after being removed for any purpose, it is preferably provided with a dowel pin 24 fitting in an opening bored in the frame to receive it when the parts are originally adjusted in place.

By means of this invention the overhanging arm substantially circular in cross section, except for the flat surface to be engaged by the wedge pin, is capable of maintaining accurate alinement of the arbor bearing of the arbor support with the spindle axis, notwithstanding the adjustments of the arm or the arbor support, thus combining the advantage of comparatively inexpensive construction of the overhanging arm circular in cross section with the advantage of accuracy of alinement of the arbor bearing of the arbor support in different adjustments possessed by overhanging arms angular in cross section.

What I claim as new and desire to secure by Letters Patent is:

1. In a milling machine, a frame, an adjustable cylindrical arm slidably fitting in the frame and provided with a flat surface lengthwise thereof of uniform depth, a cylindrical pin slidably mounted in the frame through an opening intercepting the opening in which the arm is fitted, said pin being provided with a flat surface at an angle to its axis and fitting against the flat surface of the arm to hold it in position, and an arbor support carried by the arm.

2. In a milling machine, a frame, a cylindrical arm adjustably fitting on the frame and having a flat surface of uniform depth extending lengthwise thereof, a cylindrical pin fitting in the frame and crossing the arm, said pin having a flat surface oblique to the axis thereof, the flat surface of the pin fitting against the flat surface of the arm, means for moving the pin longitudinally into clamping engagement with the arm, and an arbor support carried by the arm.

3. In a milling machine, a frame having an arm bearing, a cylindrical arm slidably mounted in the arm bearing and having a flat surface extending lengthwise thereof and of uniform depth, a cylindrical pin slidably mounted in the frame in an opening intercepting the opening in which the arm is fitted and having a longitudinal flat surface oblique to the axis thereof, the flat surface of the pin engaging the flat surface of the arm, screw studs at the ends of the pin, nuts threaded on the screw studs and engaging the opposite sides of the frame for moving the wedge pin longitudinally into and out of clamping engagement with the arm, and an arbor support carried by the arm.

4. In a milling machine, a frame, a cylindrical adjustable arm fitting in the frame and having a flat surface of uniform depth extending lengthwise thereof, a cylindrical pin slidably mounted in the frame and provided with a longitudinal flat surface at an angle to its axis to engage the flat surface of the arm and clamp the arm in place, and an arbor support slidably mounted on the arm and having a similar pin connection therewith.

5. In a milling machine, a frame, a cylindrical arm adjustably fitting in the frame, and provided with a flat surface extending lengthwise thereof and of uniform depth, a cylindrical pin fitting in the frame and crossing the arm with a longitudinal flat surface at an angle to its axis and fitting against the flat surface of the arm, means for moving the pin longitudinally to clamp the arm in place, and an arbor support slidably mounted on the arm and having a similar pin connection therewith.

6. In a milling machine having an arm bearing, a cylindrical arm slidably mounted in the arm bearing and having a flat surface extending lengthwise thereof and of uniform depth, a cylindrical pin slidably mounted in the frame and having a longitudinal flat surface at an angle to its axis fitting against the flat surface of the arm, screw studs at the ends of the pin, nuts threaded on the screw studs and engaging the opposite sides of the arm bearing of the frame for moving the wedge pin longitudinally to clamp the arm in position and an arbor support slidably mounted on the arm and having a similar pin connection therewith.

7. The combination with a milling machine frame having an arm bearing, of a supplemental frame plate secured thereto and also provided with an arm bearing, an arm circular in cross section, except for a flat surface extending longitudinally thereof and fitting within the arm bearings of the frame and the supplemental frame plate, a wedge pin slidably fitting through the arm bearing of the supplemental frame plate and being cylindrical, except for an oblique, flat surface extending longitudinally thereof, the flat surface of the wedge pin engaging the flat surface of the arm, means for moving the wedge pin longitudinally to clamp the arm in position, and an arbor support carried by the arm.

8. The combination with a milling machine frame having an arm bearing, of a supplemental frame plate secured thereto and also provided with an arm bearing, an arm circular in cross section, except for a flat surface extending longitudinally thereof and fitting within the arm bearings of the frame and the supplemental frame plate, a wedge pin slidably fitting through the arm bearing of the supplemental frame plate and being cylindrical, except for an oblique, flat surface extending longitudinally thereof, the flat surface of the wedge pin engaging the flat surface of the arm, means for moving the wedge pin longitudinally to clamp the arm in position, and an arbor support slidably mounted on the arm and having a similar wedge pin connection therewith.

9. In a milling machine, a frame member, a cylindrical, adjustable arm fitting in the frame member and having a flat surface of uniform depth extending lengthwise thereof, an arbor support member slidably mounted on the arm, and a cylindrical pin slidably mounted in one of the said members and provided with a longitudinal flat surface at an angle to its axis to engage the flat surface of the arm to clamp said member and arm together.

10. In a milling machine, a frame member, a cylindrical arm adjustably fitting in the frame member and provided with a flat surface extending lengthwise thereof and of uniform depth, an arbor support member slidably mounted on the arm, a cylindrical pin fitting in one of the said members and crossing the arm with a longitudinal flat surface at an angle to its axis and fitting against the flat surface of the arm, and means for moving the pin longitudinally to clamp the said member and the arm together.

In testimony whereof, I affix my signature, in presence of two witnesses.

JOHN GOETZ.

Witnesses:
R. S. C. CALDWELL,
KATHERINE HOLT.

Copies of this patent may be obtained for five cents each, by addressing the "Commissioner of Patents, Washington, D. C."